United States Patent [19]

Hepner et al.

[11] Patent Number: 5,704,205
[45] Date of Patent: Jan. 6, 1998

[54] METHOD OF SETTING A MAIN CONTROLLED VARIABLE DURING THE OPERATION OF A GAS-TURBINE GROUP

[75] Inventors: Stephan Hepner, Althäusern; Johann-Kaspar Scherrer, Zürich; Bozidar Seketa, Wettingen, all of Switzerland

[73] Assignee: Asea Brown Boveri AG, Baden, Switzerland

[21] Appl. No.: 609,838

[22] Filed: Mar. 1, 1996

[30] Foreign Application Priority Data

May 8, 1995 [DE] Germany ............... 195 16 799.6

[51] Int. Cl.[6] ...................................... F02C 9/50
[52] U.S. Cl. .................. 60/39.03; 60/39.27; 364/431.02
[58] Field of Search ................... 60/39.03, 39.27, 60/39.281, 39.24; 364/431.02

[56] References Cited

U.S. PATENT DOCUMENTS

| | | | |
|---|---|---|---|
| 4,137,707 | 2/1979 | Wanger | 60/39.281 |
| 4,173,119 | 11/1979 | Greune et al. | 60/39.281 |
| 4,248,040 | 2/1981 | Kast | 60/39.27 |
| 5,133,182 | 7/1992 | Marcos | 60/39.27 |

FOREIGN PATENT DOCUMENTS

| | | |
|---|---|---|
| 3422210A1 | 12/1984 | Germany . |
| WO93/15311 | 8/1993 | WIPO . |

*Primary Examiner*—Louis J. Casaregola
*Attorney, Agent, or Firm*—Burns, Doane, Swecker & Mathis, L.L.P.

[57] ABSTRACT

In a method of setting a main controlled variable during the operation of a gas-turbine group, the gas-turbine group essentially comprises a compressor (40), at least one combustion chamber (43), at least one turbine (41) and a generator (46). A desired value (3) is compared with a measured value (4) and the resulting main control difference (5) is hierarchically allocated via a management unit (1) to at least one cascade (9, 18). The cascade (9, 18) is essentially composed of a main-controlled-variable controller (6, 15) and a downstream variable controller (8, 17) which acts on the respective variable actuator (14, 23).

11 Claims, 2 Drawing Sheets

1

METHOD OF SETTING A MAIN CONTROLLED VARIABLE DURING THE OPERATION OF A GAS-TURBINE GROUP

FIELD OF THE INVENTION

The invention relates to a method of adjusting a main controlled variable during the operation of a gas-turbine group, including a compressor, at least one combustion chamber, at least one turbine and a generator.

BACKGROUND OF THE INVENTION

Such methods of adjusting a main controlled variable during the operation of a gas-turbine group are known. The output power or the rotational speed, for example, may be used as the controlled variable. Three controllers, for example, are used as the control system. When the output power is used as the main controlled variable, the first controller is an output power controller which sets the fuel mass flow to the combustion chamber in accordance with the required output power. The second controller is a turbine-inlet-temperature controller which sets the fuel mass flow to the combustion chamber in accordance with the required turbine inlet temperature. The third controller is likewise a turbine-inlet-temperature controller which sets the guide-vane position in the compressor in accordance with the required turbine inlet temperature.

Irrespective of the main controlled variable, the first and second controllers influence the same actuator, namely the fuel mass flow actuator. Consequently, situations may arise in which the two controllers interfere with one another by one trying to throttle the fuel mass flow while the other tries to increase it.

The second and third controllers are dependent upon the same output variable (turbine inlet temperature). This may lead to mutual influencing and to destabilizing of the controllers.

In order to avoid these situations, a complicated circuit logic is necessary. Furthermore, the control system reacts very sensitively to the control parameters, which makes it much more difficult to set the controllers.

SUMMARY OF THE INVENTION

Accordingly, one object of the invention is to permit simple, quick and reliable control in a method of adjusting a main controlled variable during the operation of a gas-turbine group of the type mentioned at the beginning.

According to the invention this is achieved when a desired value for a main controlled variable or parameter is compared with a measured value for that variable and a requisite main control difference is determined. The difference is then divided into portions and allocated by a management unit to at least two discrete control cascades. The management unit determines how much of the main control variable difference is allocated to each cascade. Each control cascade includes a main-controlled-variable controller, that receives the allocated difference from the management unit and a downstream variable controller which receives a signal from the main controlled variable controller and then acts on the respective variable actuator. Each control cascade acts to correct only the allocated difference for the main controlled variable.

The advantages of the invention may be seen, inter alia, in the fact that mutual influencing of the cascades is impossible due to the allocation of the respectively required main control difference, for example an output power difference or a rotational-speed difference, by the management unit to the cascades. This permits any number of cascades to be used in a control system. The variable controller is always ready for control functions due to the main-controlled-variable controller and the variable controller being connected one after the other in the cascades. Overloads caused by exceeding limit values in the gas-turbine group are thereby avoided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
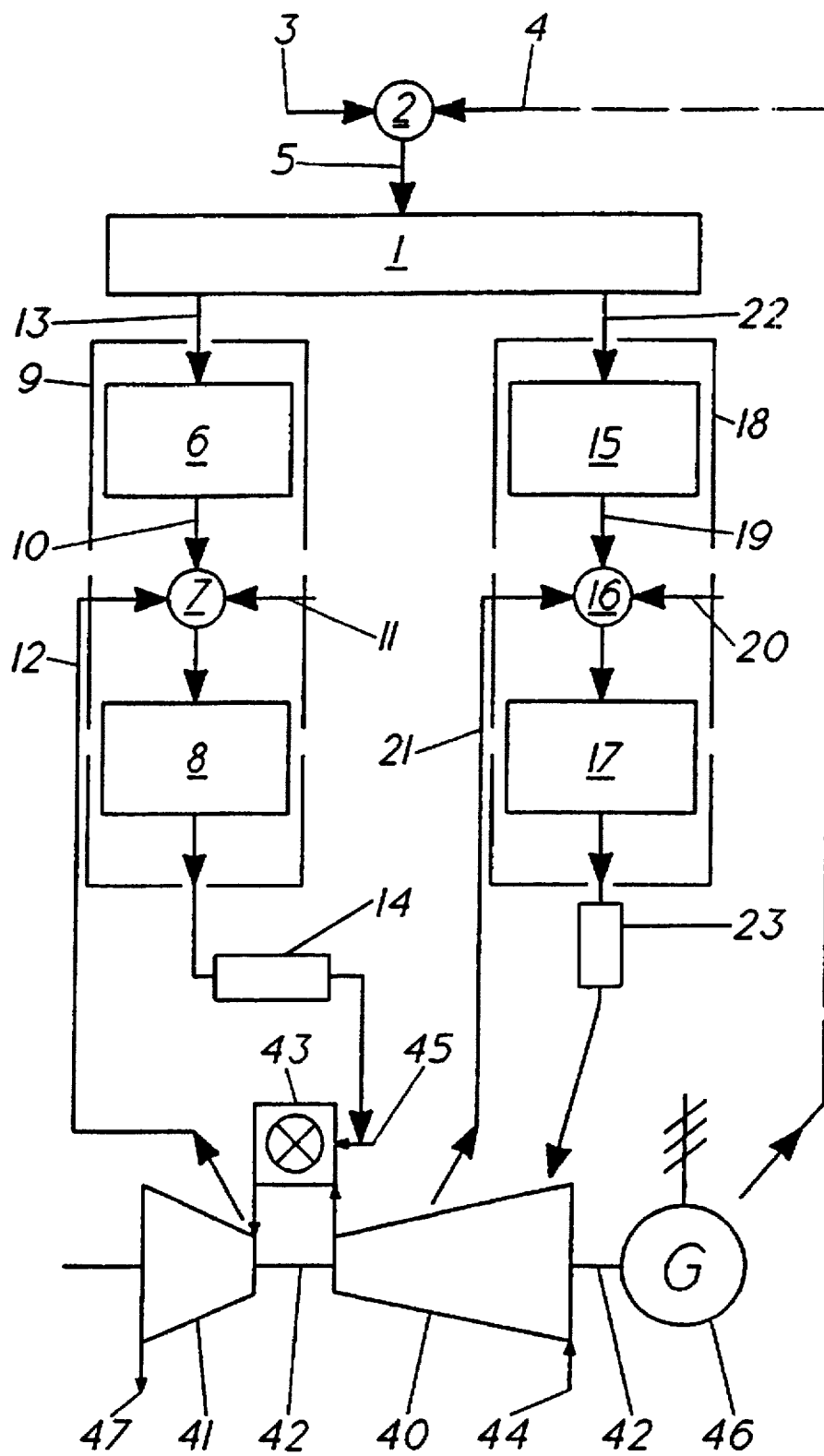
FIG. 1 shows a schematic representation of the control of a gas-turbine group in accordance with the invention.

Referring now to the drawings, wherein like reference numerals designate identical or corresponding parts throughout the several views, only the elements essential for understanding the invention are shown. The turbine inlet temperature is abbreviated below to TIT. The gas-turbine group shown in FIG. 1 includes a compressor 40, a turbine 41 and a generator 46, which are connected via a shaft 42, and a combustion chamber 43. In the compressor 40, air is drawn in via an air feed 44 and compressed. Adjustable guide vanes (not shown) are located in the compressor. The air mass flow drawn in via the air feed 44 is set by the guide-vane adjustment. The compressed air is directed into the combustion chamber 43, fuel 45 is fed to the combustion air, and the fuel/air mixture is burned. The temperature of the resulting flue gases is essentially influenced by the quantity of fuel 45. The flue gases are directed into the turbine 41, where they are expanded and some of their energy is converted into rotary energy. This rotary energy is used to drive the generator 46 via the shaft 42. The still hot exhaust gases are discharged via an exhaust-gas line 47. The heat energy of the exhaust gases may be utilized further, for example in a waste-heat steam generator (not shown), for generating steam.

The control is schematically shown above the gas-turbine group. The output power or load of the gas-turbine group is used below as the main controlled variable. An output power difference 5 between a desired output power value 3 and a measured output power value 4 is determined at a summation point 2. The output power difference 5 is processed in an output management unit 1 and allocated in portions to separate control cascades. A first difference portion 13 is allocated to a power temperature control cascade 9 and a second difference portion 22 is allocated to a power pressure control cascade 18.

In the power temperature control cascade 9, the first difference portion 13 is input to power controller 6 and is converted there into a turbine-inlet-temperature (TIT) change 10. The TIT change 10 is processed at a summation point 7 together with a TIT reference value 11 and a TIT measured value 12 and a processed temperature value is input to a temperature controller 8. The TIT reference value 11 is merely required for starting the gas-turbine group and may be any value per se, since it can be compensated for by the TIT change 10. In the temperature controller 8, the input temperature value is converted into a signal for an actuator, a fuel mass-flow setting actuator 14. The quantity of fuel 45 required for reaching the desired TIT and thus the desired power output is set via the fuel mass-flow setting 14.

In the power pressure cascade 18, the second difference portion 22 is input to a power controller 15 and is converted there into a pressure change 19 in the compressor output. The pressure change 19 is processed at a summation point 16 together with a pressure reference value 20 and a measured pressure value 21 and the processed pressure change signal is input to a pressure controller 17. The pressure reference value 20 is merely required for starting the gas-turbine group and may be any value per se, since it can be compensated for by the pressure change 19. In the pressure controller 17, the input pressure is converted into a signal for a guide-vane setting 23 to change the output pressure of the compressor an appropriate amount.

To control the respective gas-turbine group, the minimum and maximum operating variables are required as key data from the operating concept, as have been disclosed, for example, by EP 0 646 705 Al (p.5 and FIG. 3). The maximum and minimum TIT, for example, may then be gathered from the respective operating concept.

The control range of the power controller 6 is therefore given by the TIT limits from the operating concept. The power controller 6 outputs a TIT change 10 (ΔTIT) which is determined by the maximum and minimum TIT as well as by the TIT reference value 11.

ΔTITminimum=TITminimum−TITreference

ΔTITmaximum=TITmaximum−TITreference

The maximum TIT change 10 therefore results from the maximum TIT in accordance with the operating concept minus the TIT reference value 11. The maximum difference portion 13 can then be calculated from the maximum TIT change 10, which maximum difference portion 13 can be delivered by the output management unit 1 to the power temperature cascade 9. Consequently, the power potential (maximum output minus current output) of the respective power cascade 9, 18 is known to the output management unit 1 at all times.

The same situation as described above ensues for the power controller 15, where the control range is then given by the possible guide-vane settings. The maximum and minimum pressure change 19 can thereby likewise be determined, as well as the maximum and minimum output portion 22.

The allocation of the output power difference 5 by the output management unit 1 to the output cascades 9 and 18 is based on an overflow principle. If the output power is to be raised by the input of a higher desired value 3, the output power difference 5 is first delivered, for example, to the power temperature cascade 9 by the output management unit 1. If the power temperature cascade 9 is unable to produce any higher output, i.e. if the maximum TIT and the maximum output of the power temperature cascade 9 are reached, the remaining portion of the output difference 5 is delivered to the output pressure cascade 18. Of course this does not take place in succession but simultaneously, since the respective output capacities of the cascades 9, 18 are known in the output management unit 1.

The allocation of the output difference 5 by the output management unit 1 may of course also be effected by a return principle. During rapid control, the required output power is for example first allocated uniformly to the different power cascades 9, 18. If the output level is maintained, output is drawn off from one of the power cascades 9 or 18 and delivered to the other power cascade 18 or 9. This takes place until the output capacity is utilized in each case and thus the maximum value of the TIT or the pressure is reached.

Figure 2:
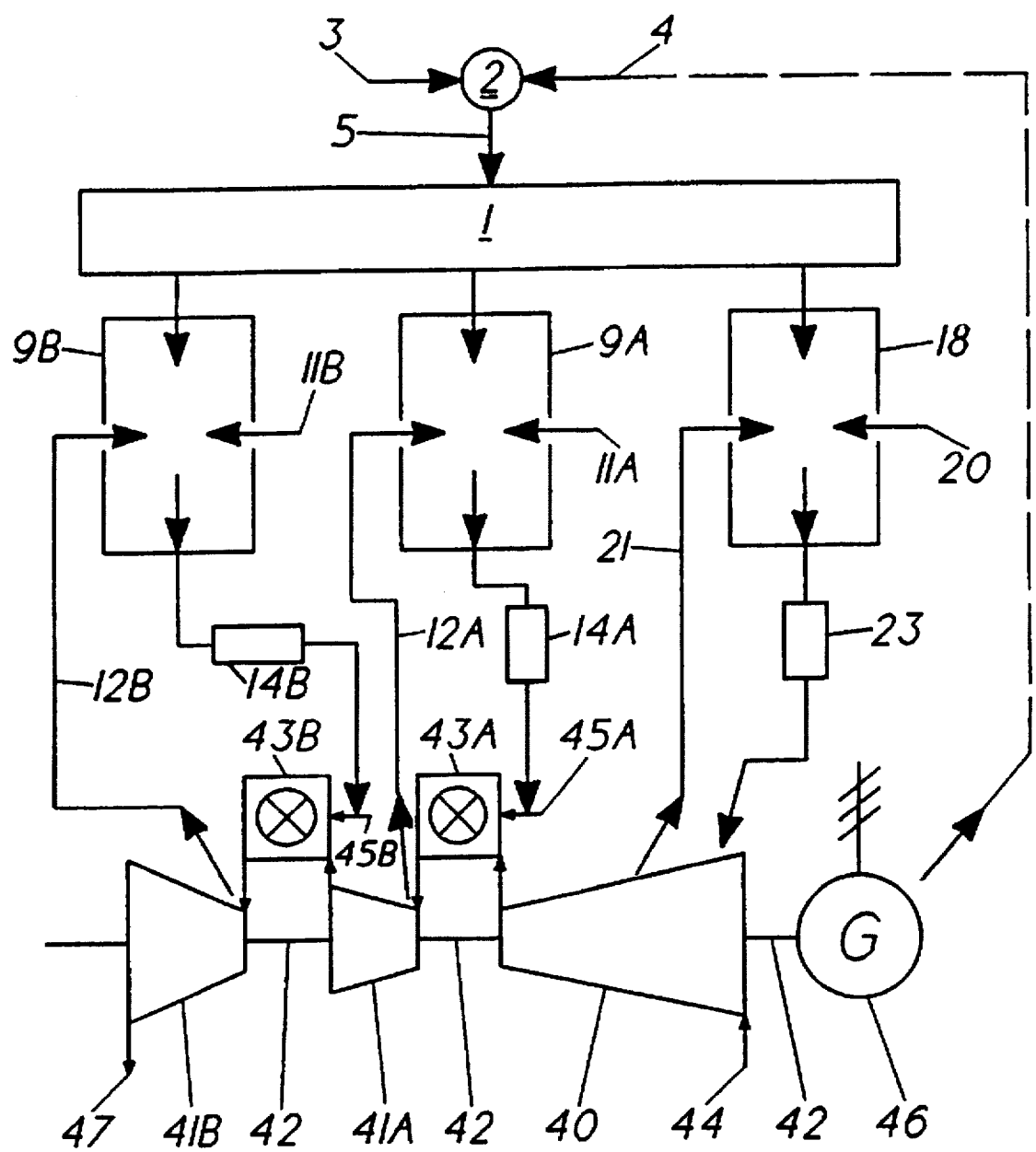
FIG. 2 shows a schematic representation of the control of a gas-turbine group in accordance with the invention with sequential combustion.

FIG. 2 shows a gas-turbine group having sequential combustion. The gas turbine group includes a compressor 40, a first turbine 41A with associated first combustion chamber 43A, a second turbine 41B with associated second combustion chamber 43B, and a generator 46. The air compressed in the compressor 40 is directed into the first combustion chamber 43A. Fuel 45A is fed there to the combustion air and the fuel/air mixture is burned. The resulting flue gases are directed into the first turbine 41A, where they are partly expanded while energy is delivered to the shaft 42. The exhaust gases. are directed into the second combustion chamber 43B, where fuel 45B is fed in and the fuel/exhaust-gas mixture is burned. The resulting flue gases are directed into the second turbine 41B, where they are expanded and some of their energy is converted into rotary energy. This rotary energy is used to drive the generator 46 via the shaft 42. The still hot exhaust gases are discharged via an exhaust gas line 47.

To control the gas-turbine group, three cascades are used here: a first power temperature cascade 9A, a second power temperature cascade 9B and a power pressure cascade 18.

The cascades 9A, 9B, 18 are controlled in this case in exactly the same way as described with reference to FIG. 1. The operating concept must of course be adapted to the sequential combustion of the gas-turbine group.

The output management unit 1 is adapted in such a way that the output difference 5 is distributed over the three power cascades 9A, 9B, 18. In a gas turbine group with sequential combustion, first the output capacity of the first power temperature cascade 9A is advantageously utilized by means of an overflow principle. A TIT measured value 12A is brought to the maximum TIT by means of a fuel mass-flow setting 14A. Then the output potential of the second power temperature cascade 9B and subsequently that of the power pressure cascade 18 are utilized.

The invention is not of course restricted to the exemplary embodiment shown and described. The output maybe replaced by alternative main controlled variables, for example by the rotational speed or the frequency (for example in the case of separate networks). The TIT measured value 12, if it cannot be determined at very high turbine inlet temperatures for technical reasons relating to the measurement, may also be obtained by calculating back from the turbine outlet temperature and the pressure.

Obviously, numerous modifications and variations of the present invention are possible in light of the above teachings. It is therefore to be understood that within the scope of the appended claims, the invention may be practiced otherwise than as specifically described herein.

What is claimed is:

1. A method of adjusting a main controlled parameter during operation of a gas-turbine group, the gas-turbine group including a compressor, at least one combustion chamber, at least one turbine and a generator, the method comprising the steps of:

comparing a desired value of a main controlled parameter with a measured value of the main controlled parameter to determine a main controlled parameter difference;

allocating the difference in portions by a management unit as difference signals to at least two control cascades, each cascade controlling a different operating variable and having a main-controlled-parameter controller to receive the allocated difference signal from the management unit and convert the difference signal for use by a variable controller which acts on a respective variable actuator, wherein, the two control cascades each adjust the respective variable according to the allocated difference signal to correct for a portion of the main controlled parameter difference.

2. The method as claimed in claim 1, wherein the output power of the gas turbine is the main controlled parameter.

3. The method as claimed in claim 1, wherein the rotational speed of the turbine is the main controlled parameter.

4. The method as claimed in claim 2 wherein the at least two control cascades includes a temperature cascade comprising a main-controlled-parameter controller and a temperature controller.

5. The method as claimed in claim 4, wherein a fuel mass-flow setting actuator is used as the actuator of the temperature controller.

6. The method as claimed in claim 2, wherein the at least two control cascades includes a compressor output pressure cascade comprising a main-controlled-parameter controller and a compressor output pressure controller.

7. The method as claimed in claim 6, wherein a guide-vane setting actuator in the compressor is the actuator of the compressor output pressure controller.

8. The method as claimed in claim 2, wherein, the management unit allocates to a first cascade a main controlled parameter difference portion corresponding to a capacity of the first cascade to adjust a first operating variable, and when the capacity of the first cascade is reached, the management unit allocates a remaining portion of the difference to a second cascade to adjust a second operating variable.

9. The method as claimed in claim 8, wherein said first cascade is a temperature cascade.

10. The method as claimed in claim 8, wherein the gas turbine group includes in series a first turbine having a first combustion chamber and a second turbine having a second combustion chamber, and wherein the method comprises allocating a main controlled parameter difference to a temperature cascade for adjusting the first combustion chamber.

11. A method of adjusting one of turbine power output and turbine speed during operation of a gas-turbine group, the gas-turbine group including a compressor, at least one combustion chamber, at least one turbine and a generator, the method comprising the steps of:

measuring one of a turbine power output and turbine speed to determine an output parameter value;

comparing a desired output parameter value with the measured output parameter value to determine a difference value;

distributing a first and second difference signal each based on a different portion of the difference value respectively to a turbine inlet temperature control cascade and a compressor output pressure control cascade, each cascade having an output parameter controller to receive the difference signal and convert the difference signal for use by a variable controller which acts on a respective variable actuator;

wherein, the turbine inlet temperature control cascade receives the first difference signal and adjusts a fuel mass flow according to the first difference signal and the compressor output pressure control cascade receives the second difference signal and adjusts the compressor output pressure according to the second difference signal so that each cascade corrects for a portion of the output parameter difference.

* * * * *